Oct. 12, 1937.   G. C. WOODRUFF   2,095,514
SYSTEM OF MEANS FOR TRANSPORTING PULVERULENT MATERIALS
Filed Sept. 21, 1934   5 Sheets-Sheet 2

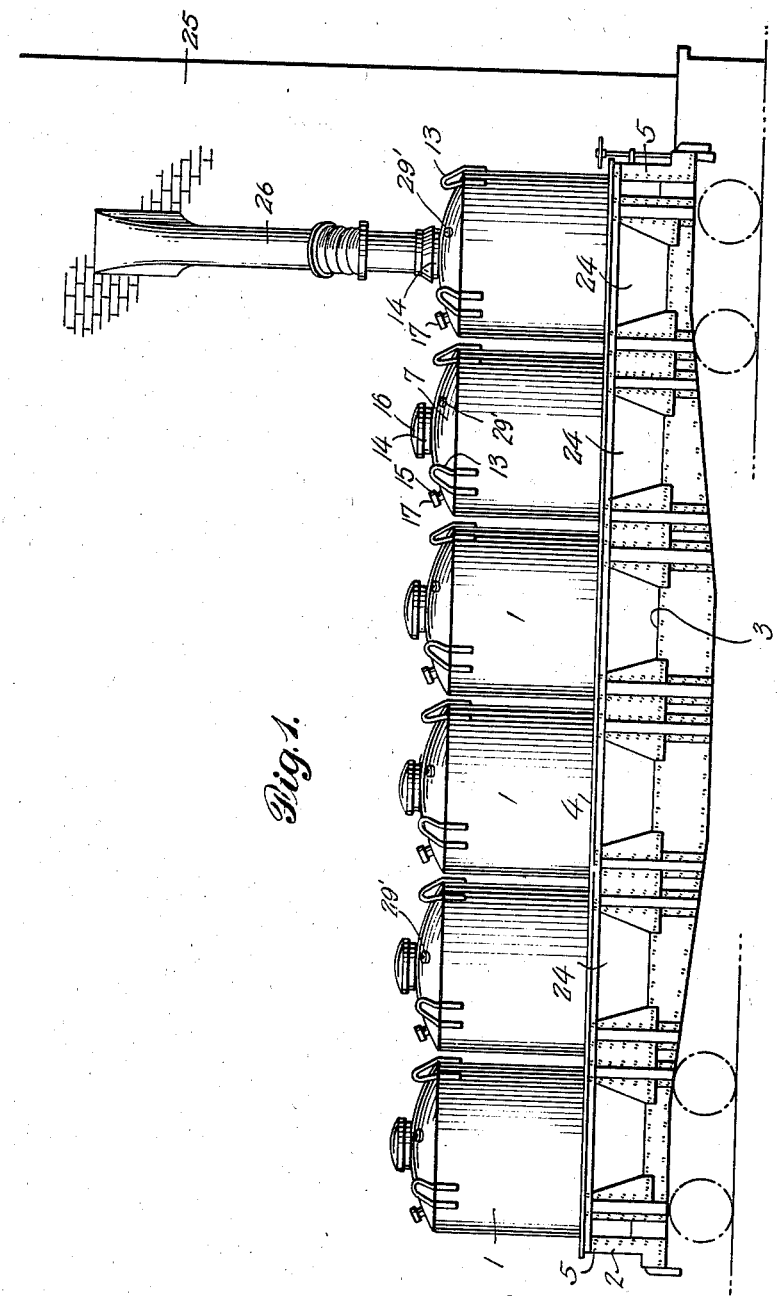

Oct. 12, 1937.　　　　G. C. WOODRUFF　　　　2,095,514
SYSTEM OF MEANS FOR TRANSPORTING PULVERULENT MATERIALS
Filed Sept. 21, 1934　　　5 Sheets-Sheet 3
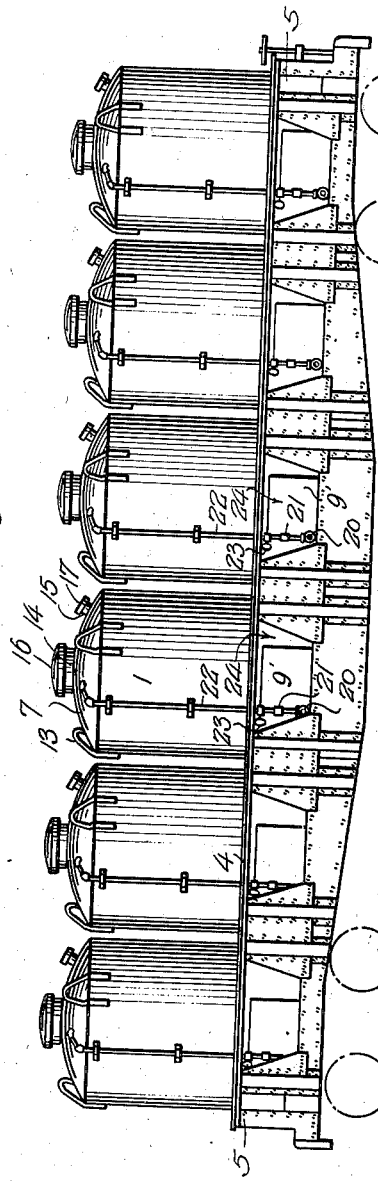

Oct. 12, 1937. G. C. WOODRUFF 2,095,514
SYSTEM OF MEANS FOR TRANSPORTING PULVERULENT MATERIALS
Filed Sept. 21, 1934 5 Sheets-Sheet 4

Inventor
Graham C. Woodruff
By
Attorney

Oct. 12, 1937.  G. C. WOODRUFF  2,095,514
SYSTEM OF MEANS FOR TRANSPORTING PULVERULENT MATERIALS
Filed Sept. 21, 1934   5 Sheets-Sheet 5
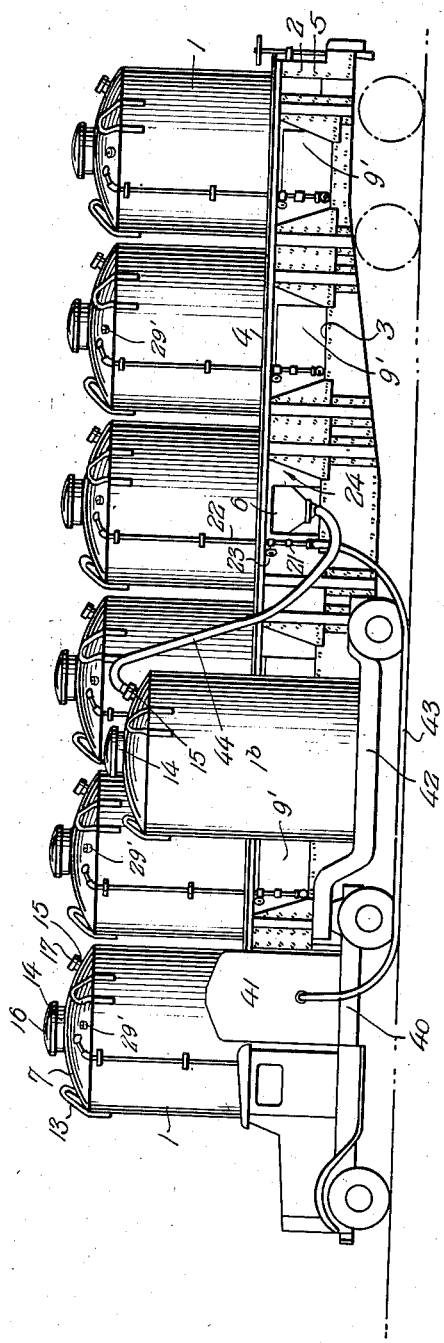
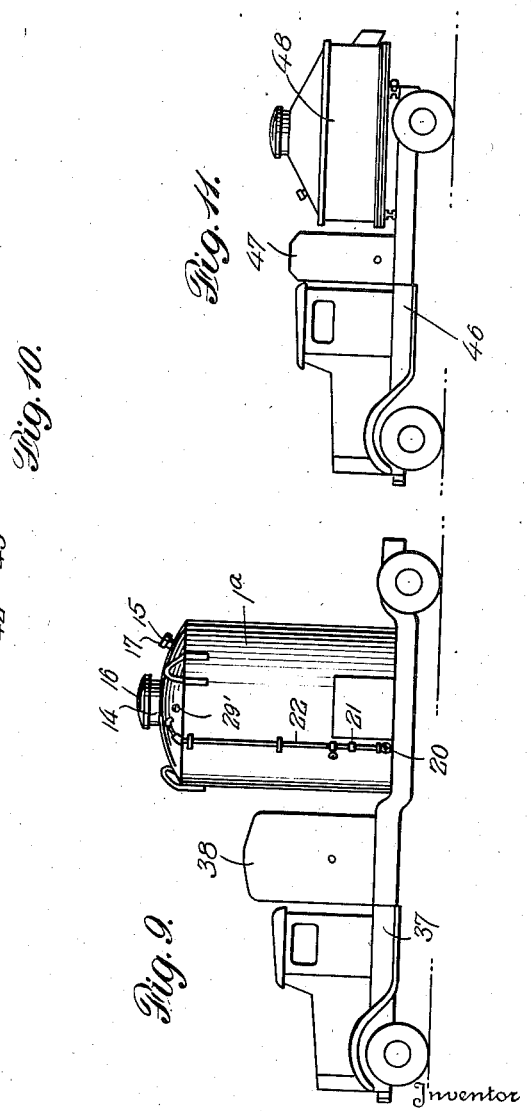

Patented Oct. 12, 1937

2,095,514

UNITED STATES PATENT OFFICE 2,095,514

SYSTEM OF MEANS FOR TRANSPORTING PULVERULENT MATERIALS

Graham C. Woodruff, Bronxville, N. Y., assignor to The L. C. L. Corporation, a corporation of Delaware Application September 21, 1934, Serial No. 745,001

3 Claims. (Cl. 214—38)

This invention relates to a new and improved system of means for transporting cement, soda ash, and other similar pulverulent solid but fluent materials which during storage and transportation should be protected as far as possible from the elements and are difficult and costly to handle under present storage and transportation methods. These commodities are usually shipped in large quantities at a time in covered hopper cars or drop bottom containers and in course of transit from the source of origin or shipping point to builders or users at a destination point, are loaded and unloaded a plurality of times, during which they are subject to atmospheric exposure and other conditions rendering them liable to injury or deterioration. As a result of these many handlings under more or less exposed conditions, great waste in losses of the material also occurs. The cost of handling these materials plus losses due to waste and injury, therefore, unavoidably make the cost of storing and handling such materials comparatively high.

One object of my invention is to provide a means whereby such losses and injury to the materials may be practically if not entirely avoided, and whereby the cost of handling the materials may be materially reduced and the materials handled with greater ease, convenience, expedition and facility.

A further object of the invention is to provide a means for handling, transporting and protecting materials of the character specified whereby the materials may be handled in a more elastic manner and to suit all requirements of service in the handling of materials under different conditions and for different specific purposes.

In the accompanying drawings showing certain means for loading, unloading and transporting materials of the character set forth in accordance with my invention and which are shown herein for purposes of exemplification,—

Fig. 1 is a side elevation of a container freight car carrying transport containers embodying my invention for use in transporting cement, soda ash and like materials, and showing the same arranged at a shipping point for the loading of the containers with the material to be transported.

Fig. 4 is a view in elevation of the container car and battery of containers thereon looking toward the opposite side from that shown in Fig. 1.

Fig. 5 is a top plan view of the same.

Fig. 9 is a view of a motor truck which may be used as a transport vehicle for conveyance of a container to and from a container car.

Fig. 10 is a side elevation of a container car and containers and a motor transport truck, illustrating the use of a master container on the truck to receive material from a container on the car and transporting the same to a desired destination point for discharge.

Fig. 11 is a view showing a dump-body or dump-bin type of truck for receiving the material from a container and delivering the same to a destination point.

Figure 3:
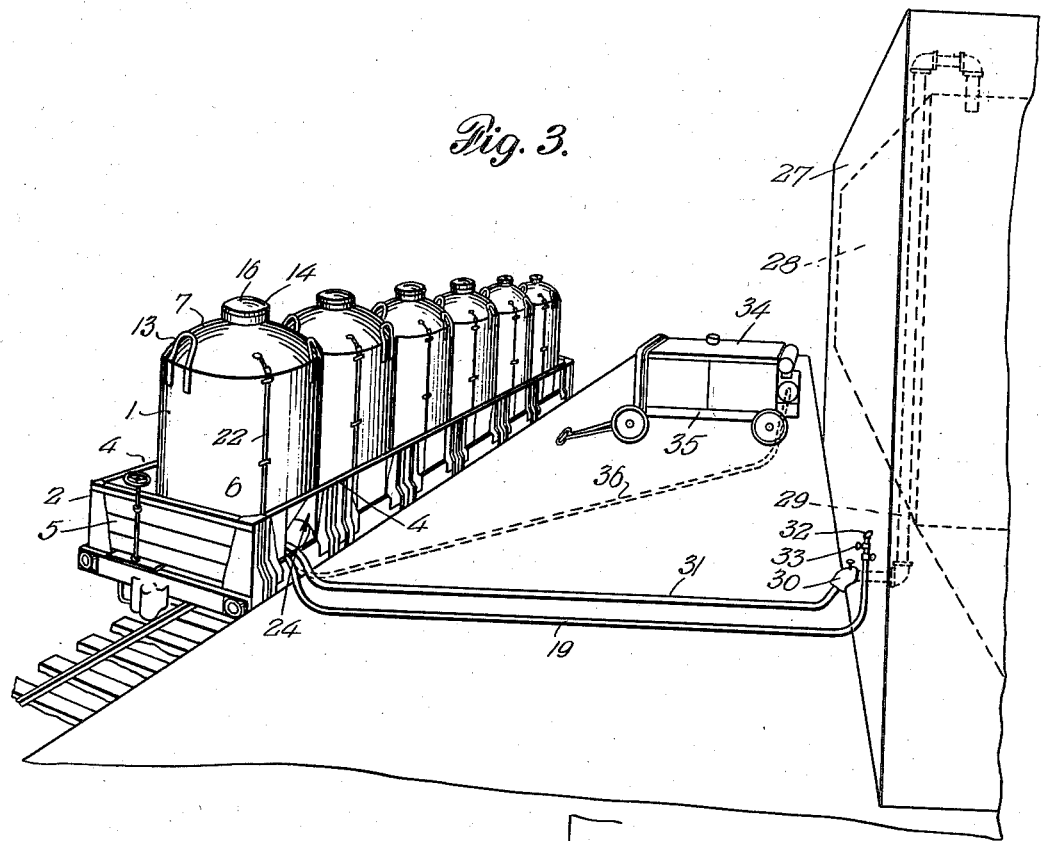
Fig. 3 is a perspective view of a container car arranged at a delivery point for an unloading action and showing the air supply and unloading conductors as employed for unloading the material into a bin at a delivery point, and also showing a portable air compressor in position to be available for use if required.

In carrying the invention into practice, the material to be conveyed from one point to another is designed to be shipped in air-tight or hermetically sealed containers 1, mounted for transport purposes on a container car or a container truck, which container is provided with means whereby it may be loaded with the material by either gravity or air pressure and also provided with means whereby the material may be discharged therefrom by air pressure through suitable discharge conductors. A longitudinal row or group of such containers 1 may be mounted in practice upon a container car 2 in such manner that the containers may be individually reached for loading and unloading purposes. The car 2 herein shown is a container car of gondola type, having a floor 3 on which the containers 1 rest and provided with side and end walls 4 and 5 which are of sufficient height to prevent displacement of the containers from the car even in the event that any of the individual containers should become unfastened in transit. The car, however, may be one of flat or platform type having suitable means for securing the containers to its floor or platform. The containers may be of any suitable size and capacity, say each of a capacity of ten tons in the handling, for example, of cement, and they may be arranged in longitudinal alinement on the car, allowing a certain number of containers, six for example, as shown in the present instance, to be mounted on a car, but any other suitable and convenient arrangement of the containers on the car may be employed.

Each container 1 comprises a vertically disposed cylindrical vessel, built as a pressure vessel, and consisting of a cylindrical shell having a hopper bottom 6 and a dished head 7, all strongly welded or otherwise fastened together. To enable this container vessel to be supported on the car floor 3, the cylindrical shell is extended downwardly in the form of a cylindrical base 7' forming a compartment 8 about the conical hopper bottom 6. This compartment is conveniently accessible through an opening 9 provided in one of its sides, which opening may be or not, as desired, closed by a hinged or other suitably mounted door 9'. The parts 6 and 7 of the container are stiffened by suitable gussets 10 and the lower edge of the part 7' is provided with suitable guiding and positioning retainers 11 to engage segmental holding brackets 12 in the car floor, whereby the containers, which are also adapted to engage retainer brackets 12' on the sides of the car will be held in fixed position and against rotational shifting while the car is in transit, but at the same time will be free from positive fastening connection with the car so that the containers are readily removable from the car whenever desired. At its top each container is provided with lifting links or loops 13 by means of which it may be engaged by a hoisting crane or other hoisting apparatus for convenient transfer from the car to a loading platform, or vice versa, or between a car or loading platform and a ship, or between a car or ship and a transportation truck, thus allowing of the ready transfer of loaded or unloaded containers between stationary platforms on the ground or loading points and transportation vehicles, or between transportation vehicles of different characters.

Each container 1 is provided at its top with a main central filling mouth or inlet 14 and with an auxiliary filling mouth or inlet 15 which are normally closed by suitable air, water and dust-proof caps or closures 16 and 17, and which closures, after the container is filled, may be locked or sealed in any approved manner against surreptitious removal and to ensure the maintenance of the container in a hermetically sealed condition. The main inlet 14 provides a filling mouth of comparatively large size adapting the container to be filled by gravity from a feed chute, conveyor or large sized conductor, while the inlet 15 is of relatively smaller size and designed to receive a flexible tube or conductor of suitable size through which the container may be filled when occasion requires, by air pressure. The inlets 14 and 15 are preferably provided with suitable valves 14' and 17' adapted to open automatically by gravity or spring pressure when the closures 16 and 17 are removed, but to close under internal pressure. The material is discharged from the container through an outlet in one side of its hopper bottom 6, with which outlet is connected a discharge fitting 18 to which may be coupled a discharge conductor of any suitable length. Arranged in the compartment 8 so as to be housed and protected thereby may be suitable parts or fittings of an air supply system. The parts or fittings shown as applied to each tank consist of an air feed pipe 19 having a valved inlet connection 20 and from which pipe 19 the supply branches 21 and 22 connect respectively with the hopper bottom 6 and the interior of the container at the top thereof, whereby air under pressure may be simultaneously supplied to the hopper bottom to promote the discharge of the material through the outlet connection and supplied at the top of the container to place a proper head pressure on the body of the material therein. A valve 23 may be placed in the pipe 19 at its point of connection with the branch 22 to regulate the flow of air through such branch and to cut off the flow whenever desired. The pressure of the air supplied from a suitable source through the pipe 19 may be such as in practice is suitable for discharging the material through a discharge conductor of a required given size and at any desired or predetermined rate. In practice the pressure may be such as is necessary to convey the material through a comparatively long conductor when a receiving bin or the like at a destination point is disposed some distance from the container from which the material is being discharged. The doorway or access opening in the base of each container is arranged in practice so as to face an access opening 24 in one of the sides of the car 2, so that convenient access may be obtained by an attendant standing on the ground or a platform to the hopper outlet and fixture, while at the same time the fixture applied to the base of the container will be protected against injury by contact with extraneous objects in the travel of the container car.

Figure 2:
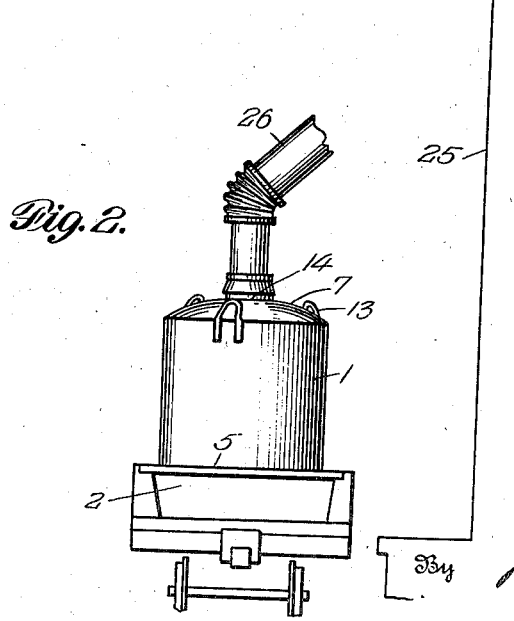
Fig. 2 is an end elevation of the container car, containers and loading means shown in Fig. 1.
Figure 6:
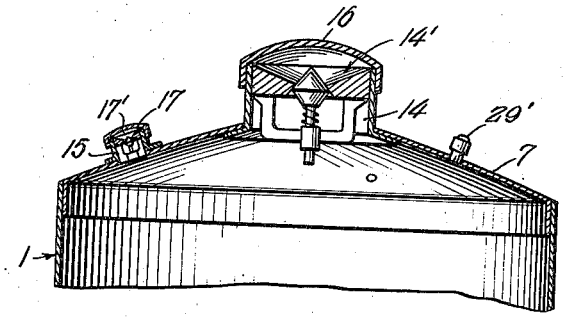
Fig. 6 is a vertical section through the top of one of the containers.
Figure 7:
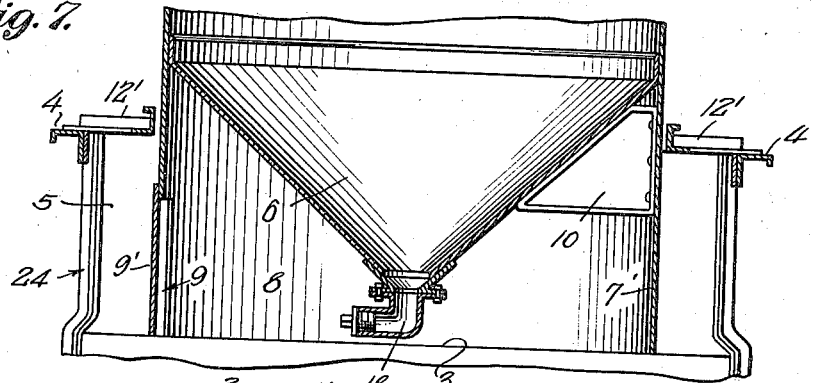
Fig. 7 is a similar section through the bottom of the container.
Figure 8:
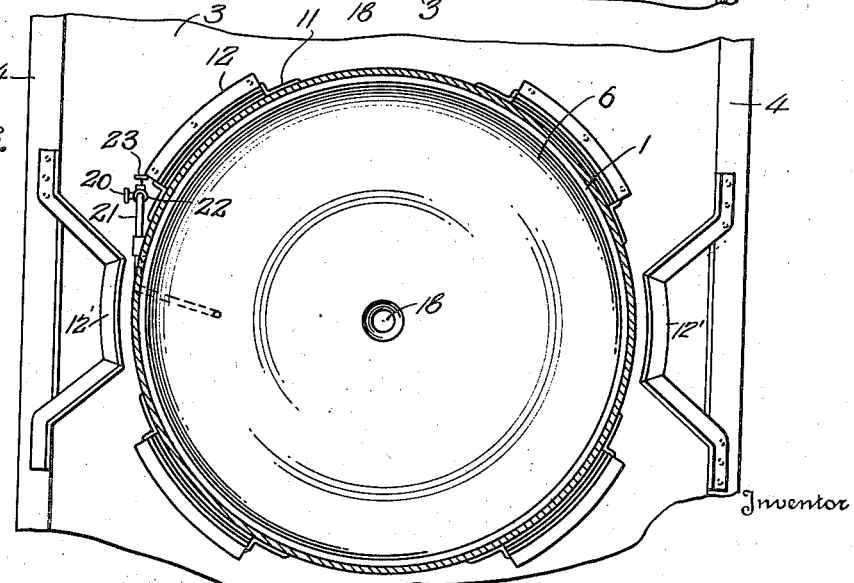
Fig. 8 is a horizontal section of Fig. 7.

Figs. 1 and 2 show a manner of loading a battery of containers 1 on a container car 2 disposed on a side track alongside a production plant 25 for the loading of the containers with the cement or other bulk commodity which is to be shipped from a consignor's plant to a storage warehouse, builders supply establishment or other consignee at a more or less distant point. The containers when so disposed may be individually or simultaneously filled through one or more conductors 26 connected with their main filling mouths or inlets, which mouths or inlets of the containers are hermetically closed and sealed after the containers are filled. The loaded containers on the car 2 are then transported thereby to the destination point where the containers, or more or less of them, are to be unloaded. Fig. 3 shows the car 2 arranged on a side track alongside a consignee's storage warehouse or builders supply establishment 27 having therein a storage bin 28 with which connects a filling pipe 29 provided with a valved inlet connection 30 located outside the building, to which connection may be coupled a flexible unloading pipe or tube 31 designed to be attached to the discharge outlet connection of any one of the containers 1. Fig. 3 also shows an air pressure supply pipe 32 leading from a valved connection 33 forming part of a permanent compressed air supply equipment at the consignee's plant, which pipe is connected with the air inlet connection 20 of the air supply pipe 19 of the container which is to be unloaded for the supply of air under pressure thereto. The proper valves being open for the feed of air to the container from the supply plant the contents of the tank will be forced from the container into the pipe 31 and from the latter through the pipe 29 into the storage bin or receiver 28. In this manner the containers, or any number of them to be unloaded at the same point, may be easily and quickly discharged of their contents and by the use of a proper number of supply connections all or any suitable number of the containers may be loaded at one and the same time.

The above-described mode of delivery of the material directly from containers on a transport car applies, of course, under conditions where the consignee's establishment is provided with a permanent air compressor installation for the purpose of supplying the necessary air feed pressure. In case, however, that the establishment is not supplied with a fixed and permanent pressure supply equipment, a portable air compressor 34 of the type shown in Fig. 3 may be used. This may be in the form of a hand or motor propelled truck 35 provided thereon with an air compressor driven by a self-contained internal combustion engine or electric motor, and having a suitably controlled air outlet for attachment of an air supply pipe 36 designed to be connected with the air inlet connection 20 of the container, which type of compressor may be used at different points in or about the establishment when side tracks are available at one or more points for loading operations and may be stored at any convenient point within the establishment when not in use.

It is necessary, however, that such a system of loading, unloading and transporting commodities of the character set forth be sufficiently flexible to enable it to be employed under other conditions, as where, for example, there is no side track or other track connection available for running the container car to the consignee's establishment, or no supply of the compressed air is available at the establishment, or where compressed air may be available at the establishment for use but no side track is available and it is desired to unload the containers directly in a railroad yard and convey the material therefrom to the plant, or it is desired, in lieu thereof, to transport the containers from the railroad car to the consignee's plant for the unloading operation. In order to enable these various requirements to be met, I may provide, as shown in Fig. 9, a transport motor truck 37 carrying an air compressor 38 operated by the motor thereof and which is adapted to receive and store either a container 1 of the type described which is lifted from the car onto the truck for transport thereby to the consignee's establishment, or which is adapted to support as a permanent fixture a master container 1a similar in type to the containers 1. In lieu of such a truck I may employ, as shown in Fig. 10, a motor truck 40 of tractor type having mounted thereon a compressor 41 which may be driven either by the engine thereof or by an independent engine and which is adapted for the connection therewith of a trailer 42 adapted either for the support and conveyance of a container 1 lifted thereon from the car or for permanently supporting thereon a master container 1b structurally similar to the containers 1 or 1a. The motor truck of either type may be used for individually transporting the containers 1 from the car 2 to a consignee's establishment or place of destination, when there are no trackage accommodations at the destination point, and, if desired, the compressed air equipment of the truck may be employed at the destination point or consignee's establishment for the purpose of discharging the material from the container thereon into the bin or other receptacle at the establishment. The use of a master container in place of a regular or conventional container 1 may be optional in many cases and obligatory in others, obligatory when it is necessary, because of limitations of motor truck width, not admitting of the reception thereon of a regular container, to substitute therefor a master container which is of less diameter than a regular container but of greater height or otherwise proportioned to have the same receiving capacity. Either form of motor truck transport may be adapted for use interchangeably with regular containers or a special or master container to render the system sufficiently applicable to meet various contingencies in service. Where a master container 1a or 1b is used on the transport truck, there will, of necessity, be an intermediate transfer of material from a container on the container car to the master container before delivery of the material to the consignee's bin or receiver. For the purpose of enabling this transfer action from the car container to the master container to be effected the air compressor apparatus of the truck may be employed to furnish the air under pressure through a flexible pipe 43 to the inlet of the container which is to be unloaded, while a flexible unloading pipe 44 is used to connect the discharge outlet of the car container with the auxiliary inlet 15 of the master container on the truck through which latter the master container will be filled. The truck bearing the master container will then convey its load to the point of destination or consignee's establishment where the load may be discharged from the master container in the same manner as that illustrated in Fig. 3 with the exception that the compressor on the truck is connected by the pipe 43 to the air pipe on the master container for the discharge of the material and the unloading pipe 44 of the master container will be employed to connect the outlet thereof with the delivery pipe leading to the receiving bin at the consignee's establishment.

In many cases it is also desirable to unload the material directly from a container on the car into the bin or hopper of a transport truck of dump-bin or dump-hopper type for transfer of the material as unloaded to a building site or other site where the material is to be used for building construction or other purposes. In Fig. 11 I have shown a transport truck 46 adapted for such purpose, which truck is shown as provided with a compressor 47 and a bin or hopper 48 of dump type, said bin or hopper being of a suitable air and waterproof type to protect the material from the weather while permitting it to be dumped. In unloading the material from a container 1 into such a hopper, a flexible air supply pipe is used to connect the compressor with the air supply pipes on the container 1 and a flexible unloading pipe is employed for connection with the outlet of the container 1 through which the material will be discharged into the bin or hopper. When the bin or hopper is loaded the material therein may then be transported to the delivery site and dumped there for immediate use or temporary storage, as desired. By the use of such a system of transport trucks substantially any condition of service may be met for transporting the material either in original or other containers from a freight car, ship or other transport vehicle to destination points either for immediate use or storage and whether or not an air pressure equipment is available for unloading at the destination point. I may, however, omit the compressor 47 from the truck and use a plain dumping truck with a protecting hopper body of suitable type.

In practice, each master container will be provided at the top with a suitable filter vent 29' to allow excess air to escape, so as to prevent the container from becoming air bound and interfering with the discharge action.

The use of my system of unloading, transporting and loading receptacles will be found of great advantage in shipping cement, soda ash and other similar materials over prior ways of shipping such materials in bulk or in package form, i. e., put up in bags, as the necessary equipment is not expensive, and as the amount of handling of the material is reduced to a material degree, the use of packing bags obviated, and waste losses due to actual losses in the material through handling or injury to the material by exposure prevented. My system of unloading, transporting and loading also ensures against losses by theft and the delivery with certainty of the original amount of material shipped, with substantial certainty also that the material received will be in the same condition as when shipped. The sizes of the containers which may be used also adapts the system for the transportation of large quantities of material at a time and in such manner that the entire amount of the material may be extruded with certainty, while the flexibility of the system adapts it to meet all kinds of transportation problems involved either in direct unloading or indirect loading under the different conditions hereinbefore recited commonly met in transportation service. As the material discharged from a container is subject to both head pressure of the air at the top of the container and to pressure of the air at the discharge point, whereby the tendency of the material to pack at the discharge outlet is prevented, a rapid discharge of the material from the container and a complete emptying of the container in an unloading action is effected and ensured. As labor and transport costs are also saved by this rapid system of unloading, and as the number of transport vehicle changes between a shipping point and a destination point may be reduced to a single change in the vast majority of cases, the expense of handling these materials is reduced to the minimum.

In the practical loading and unloading of the containers, it has been found that a single container or a series of such containers may be loaded by gravity from an elevated source within a very short period of time, and that for the purpose of furnishing air under pressure for discharging the load of a ten to twelve ton capacity container, a compressor having a capacity of approximately three hundred cubic feet per minute is employed with a four inch discharge line and that a compressor having a capacity of about two hundred cubic feet per minute will be found suitable in connection with a discharge line of smaller diameter, under which conditions a somewhat longer time is required in the unloading operation owing to the rapidity and completeness of the discharge action. The estimated cost of discharging cement from a container into a receiving bin by this system is not in excess of ten cents per ton. The amount of pressure in the air supply line required ordinarily varies between sixty and seventy pounds, the material starting to discharge through the discharge line at a pressure within the container of five pounds and at a maximum pressure within the container not exceeding twenty-three pounds. The load of a container of a capacity of from ten to twelve tons may be completely discharged within a period of from nine to ten minutes. The container may, therefore, be unloaded rapidly at a comparatively low supply pressure and so completely as to leave none of the material remaining in the container.

It may be found advantageous to load a container so that the material does not completely fill it but terminates below the top of the container sufficiently to leave a space which may be filled with air under a certain pressure, held from escape by the sealed inlets at the top of the container. This air will form an elastic cushion tending to hold the body of the material against vertical motion and agitation in the travel of the car or truck, whereby its tendency to pack in the container during transit will be reduced.

While the apparatus herein shown is preferred, it will, of course, be understood that variations therefrom falling within the scope of the appended claims may be made without departing from the spirit or sacrificing any of the advantages of the invention.

What I claim is:—

1. A system of transportation for cement, flour and other like pulverulent materials comprising a plurality of carriers of different kinds, pressure containers of identical type adapted to be mounted on said carriers, each of said containers consisting of an upright cylindrical vessel having a bulk filling inlet at its top, a pressure filling inlet at its top, a discharge outlet at its bottom, means for hermetically sealing said inlet and outlet, said discharge outlet and pressure filling inlet being adapted for interchangeable connection of the outlet and pressure inlet of containers on the same carrier or different carriers through a conductor for discharging the material from one container to the other, conducting means on each container for simultaneously introducing a pressure fluid into the bottom of the container adjacent to the outlet for breaking up any massed portions of the material and discharging the material in finely divided condition, and flexible conductors for connecting the conducting means communicating with the top and bottom of a container on one carrier with a source of fluid pressure and the outlet of said container with the pressure filling inlet of a container on another carrier for discharging the material without atmospheric exposure from the first container into the second container.

2. A system of transportation for cement, flour and other like pulverulent materials comprising a plurality of carriers of different kinds including a carrier having means thereon for supplying fluid under pressure, pressure containers of identical type adapted to be mounted on said carriers, each of said containers consisting of an upright cylindrical vessel having a bulk filling inlet at its top, a pressure filling inlet at its top, a discharge outlet at its bottom, means for hermetically sealing said inlet and outlet, said discharge outlet and pressure filling inlet being adapted for the interchangeable connection of the outlet and pressure inlet of containers on the same carrier or different carriers through a conductor discharging the material from one container to the other, conducting means on each container for simultaneously introducing a pressure fluid into the bottom of the container adjacent to the outlet for breaking up any massed portions of the material and discharging the material in finely divided condition, and flexible conductors for connecting the conducting means communicating with the top and bottom of a container on one carrier with the source of fluid pressure on a second carrier and the outlet of said container with the pressure filling inlet of a container on the second carrier for discharging the material without atmospheric exposure from the first container into the second container.

3. A system for transporting cement, flour and like pulverulent materials comprising transport carriers for conveying the material from a shipping point to a destination point, interchangeable, portable, hermetically sealed pressure containers of identical type for containing the material and protecting the same from deterioration during shipment, said containers adapted to be mounted on said carriers, each of said containers consisting of an upright cylindrical vessel having a bulk filling inlet at its top, a pressure filling inlet at its top, a discharge outlet at its bottom, said discharge outlet and pressure filling inlet being adapted for the interchangeable connection of the outlet and pressure inlet of containers on the same carrier or different carriers through a conductor for discharging the material from one container to the other, conducting means on each container for simultaneously introducing a pressure fluid into the bottom of the container adjacent to the outlet for breaking up any massed portions of the material and discharging the material in finely divided condition, a material receiver at the destination point, an air pressure supply conductor at the destination point for connection with the conducting means on the container and a second conductor at the destination point for connecting the container with said receiver for effecting the discharge of the material from the container to the receiver under fluid pressure supplied through said fluid pressure conducting means on the container, said second conductor comprising a stationary section arranged to discharge into the receiver and a flexible section for connection with the container outlet.

GRAHAM C. WOODRUFF.